(12) United States Patent
Atkinson et al.

(10) Patent No.: US 7,123,692 B2
(45) Date of Patent: Oct. 17, 2006

(54) CRAFT MENU SYSTEM USING CALLER ID FUNCTIONALITY FOR INSTALLATION AND TESTING

(76) Inventors: Douglas A. Atkinson, 20102 Muirfield Village Ct., Ashburn, VA (US) 20147; John Taliaferro Burch, 943 Kimberwicke Rd., McLean, VA (US) 22102

(*) Notice: Subject to any disclaimer, the term of this patent is extended or adjusted under 35 U.S.C. 154(b) by 289 days.

(21) Appl. No.: 10/662,716

(22) Filed: Sep. 15, 2003

(65) Prior Publication Data

US 2005/0013415 A1   Jan. 20, 2005

Related U.S. Application Data

(60) Provisional application No. 60/487,212, filed on Jul. 14, 2003.

(51) Int. Cl.
*H04M 1/24* (2006.01)
*H04M 3/08* (2006.01)
*H04M 3/22* (2006.01)

(52) U.S. Cl. .................. 379/21; 379/26.01; 379/29.01

(58) Field of Classification Search ............ 379/27.01, 379/26.01, 29.01, 27.03, 1.03, 1.04, 1.01, 379/21
See application file for complete search history.

(56) References Cited

U.S. PATENT DOCUMENTS

| | | | |
|---|---|---|---|
| 5,583,912 A * | 12/1996 | Schillaci et al. ............... | 379/21 |
| 5,592,528 A * | 1/1997 | Nelson et al. ................ | 379/21 |
| 5,933,475 A | 8/1999 | Coleman | |
| 5,953,389 A | 9/1999 | Pruett | |
| 5,974,115 A * | 10/1999 | Chan et al. ............... | 379/27.01 |
| 5,982,851 A * | 11/1999 | Kennedy et al. ............... | 379/21 |
| 6,005,865 A | 12/1999 | Lewis | |
| 6,005,921 A | 12/1999 | Keefe | |
| 6,278,769 B1 * | 8/2001 | Bella ........................ | 379/29.11 |
| 6,333,940 B1 | 12/2001 | Baydar | |
| 6,388,399 B1 | 5/2002 | Eckel | |
| 6,516,053 B1 * | 2/2003 | Ryan et al. .................... | 379/21 |
| 6,539,384 B1 | 3/2003 | Zellner | |
| 2002/0136165 A1 * | 9/2002 | Ady et al. .................. | 370/241 |
| 2002/0184644 A1 | 12/2002 | Lund | |
| 2003/0056226 A1 | 3/2003 | Lazarus | |
| 2003/0093406 A1 | 5/2003 | Zellner | |
| 2004/0066913 A1 * | 4/2004 | Kennedy et al. ............... | 379/22 |
| 2004/0086086 A1 * | 5/2004 | Butler et al. ................... | 379/9 |

* cited by examiner

*Primary Examiner*—Binh K. Tieu
(74) *Attorney, Agent, or Firm*—Holland & Knight LLP; Kevin A. Buford

(57) ABSTRACT

A craft menu system, in a presently preferred embodiment, includes a network terminal like an ONT, having a processor and memory and multiple data ports, configurably coupled to a DTMF telephony (e.g., BUTT) test set for installation and testing. The installation, registration and testing information needed by a technician is provided by the ONT to the BUTT set display using convenient Caller ID signaling, and technician data entry is accomplished via the DTMF-enabled keys on the BUTT set. This system allows a single technician, equipped with current standard tools like a BUTT set and without the need for additional tools like a PC or PDA, to install and test a craft menu enabled ONT in a timely and efficient manner.

18 Claims, 2 Drawing Sheets

CRAFT MENU SYSTEM USING CALLER ID FUNCTIONALITY FOR INSTALLATION AND TESTING

This application claims the benefit of 60/487212 filed on Jul. 14, 2003.

FIELD OF THE INVENTION

The invention in general relates to the field of communications, and more particularly to premises broadband communication systems.

BACKGROUND

One of the key challenges in the communications industry today is how to provide a cost effective, broadband solution for getting multiple services, such as telephony, video, and high speed data, to users in such diverse premises as homes and business buildings. The existing telephone service, sometimes known as plain old telephone service (POTS), may suffice for some telephony and data requirements, but is bandwidth constrained and inadequate for more demanding services like video provisioning. Cable television (CATV) systems do provide a broadband solution for delivering digital and video data, but the reliance on coaxial cable for the final distribution to homes and other premises remains a bandwidth limited solution. Thus, because of the superior bandwidth of fiber optic solutions, a variety of systems have been proposed to provide fiber to the home/business (FTTH/B) as the best overall solution for broadband services.

The leading FTTH/B solutions rely on passive optical networks (PONs), in which the optical network is terminated at the premises in some form of optical network terminator (ONTs). However, one problem present in today's solutions for coupling the optical networks, via the ONTs, to local premises networks, is the expense and complication of providing trained technicians with the necessary set-up equipment for the given installation. In a typical telephony installation, technicians carry a general technician toolkit to install cables (phone lines) and a simple BUTT set to test these phone lines. More is required in a FTTH/B installation, though, so more specialized tools and training are required to roll out these new services. These tools have included PDAs (personal digital assistants) or even laptop computers, for handling specialized functions like system registration and a suite of test functionality. These existing solutions are both more costly and time consuming.

Thus, there remains a need for a simpler, more cost effective and efficient solution for installing and testing broadband (e.g., optical) and local premises networks. Just such a solution to these and other problems noted above, is made possible by my invention.

SUMMARY

An illustrative summary of the invention, with particular reference to the detailed embodiment described below, includes a network terminal such as an ONT, having a processor and memory and multiple data ports. The ONT is configured for coupling to a DTMF telephony (e.g., BUTT) test set for installation and testing. The registration and testing information that is needed by the technician to complete an installation or test is provided by the ONT to the BUTT set display using convenient signaling like a Caller ID format, and data entry from a technician is accomplished via the DTMF-enabled keys on the BUTT set. An appropriately configured menu system stored in the ONT allows a single installation technician using this system, equipped with current standard tools like a BUTT set but without the need for additional tools like a PC or PDA, to install or test an ONT in a timely and efficient manner.

THE FIGURES

My invention may be more readily appreciated from the following detailed description, when read in conjunction with the accompanying drawings, in which.

DETAILED DESCRIPTION OF AN EMBODIMENT OF THE INVENTION

A presently preferred embodiment according to our invention includes a network terminal configured to provide installation and testing information by way of appropriately formatted display characters (e.g., Caller-ID data) to a simple test unit like a telephony BUTT set. When connected to the BUTT set, the user/technician can be prompted to enter required and/or optional information via the input (e.g., a DTMF key pad on the BUTT set), and by a series of pre-defined steps expeditiously and cost-effectively complete the desired installation and test steps. Since the intelligence is in the ONT, this preferred solution can be implemented using standard technician equipment. This enables a cost effective and rapid deployment of FTTH/B solutions, while minimizing the risk of configuration mistakes during installation and testing. A particular example is given below dealing with entering registration codes for newly installed ONTs, but this system is also designed for other test and set-up uses, such as for trouble-shooting of registered network terminals or re-registering repaired or replaced ONTs.

A preferred network terminal is an ONT, having an interface for installation and maintenance utilizing a standard Caller-ID process (e.g., based on (GR-30-CORE) FSK) for signaling to the test unit/BUTT set, from which a menu system may be displayed via a Caller-ID display. The return signaling is readily accomplished using a standard key pad, the DTMF signals being formatted in a Caller ID-compatible format (i.e., GR-30 compliant messaging from a CPE (the BUTT set) to an SPCS (the ONT)); the signaling is then received, converted and processed by the ONT. With the implementation of an easily changeable menu system, the Service Provider can define a menu system that utilizes the numeric input from the BUTT set and Caller ID to guide a technician through processes such as registration and testing. The technician will be presented with test prompts and can select options and enter values from the keys on the BUTT set.

Figure 1:
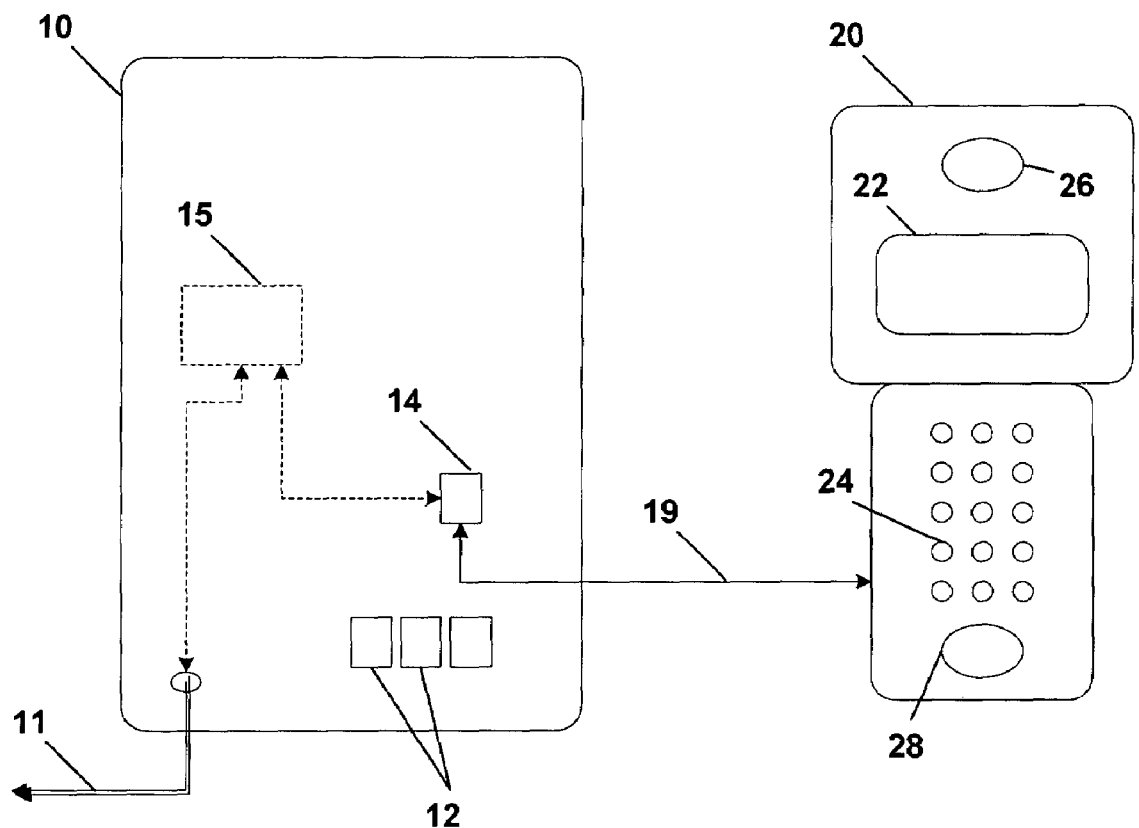
FIG. 1 is a general block diagram of a system illustrating a test unit and network terminal for use in installation and testing within a premises according to a first embodiment of the invention.

FIG. 1 illustrates a system according to the presently preferred embodiment. BUTT set 20 is coupled to ONT 10 via RJ-11 port 14 and cable 19. ONT 10 has additional ports 12 for its other functionality, and is coupled to an OLT (Optical Line Termination, not shown) of the external network via cable 11. A processor and memory 15 contain appropriate system programming, including the code and settings for use in registration and testing (e.g., testing of in-house wiring, system testing, etc.) of the ONT and premises communications system. BUTT set 20 includes a caller ID display 22, a key pad 24 for entry of alphanumerics by a user, and a speaker 26 and microphone 28 and other typical and/or optional BUTT set circuitry.

The processor and memory 15 can be any convenient form, preferably implemented as part of the components used for other functionality of the ONT. The actual software or firmware may vary depending on the specific design needs to the given networks and terminators involved, and may be loaded at the factory or later, at the carrier's premises in batch or even in the field, locally or (for units already coupled to the carrier's network) remotely. Also part of the ONT are converters for converting the data to and from the ONT processor between its normal processing format on the one hand, and the inbound Caller ID-compatible (i.e., SPCS to CPE for the ONT to BUTT set link) and outbound signaling (i.e., CPE to SPCS for the BUTT set to ONT link, or DTMF) formats on the other hand. One skilled in the art will readily appreciate that there are many alternatives available, with particular selections being dictated by the design choices of the manufacturer or service provider.

In the preferred embodiment, the process of registering the ONT requires the input of a registration code via the BUTT set, that is sent on to the OLT and management system. At initial power up, the ONT could be configured to boot to a registration menu. Once a registration code is successfully entered and a configuration received from the OLT, the registration portion of the menu system is disabled. In order to re-enable this menu, the system may be defaulted.

The system utilizes the Caller ID function in the Off Hook state to send messages to the BUTT set. These messages can be defined to ask for serial numbers, work order numbers or to execute specific tests. The system reports back entered DTMF (dual-tone multi-frequency) digits for confirmation to insure the entry is correct.

Figure 2:
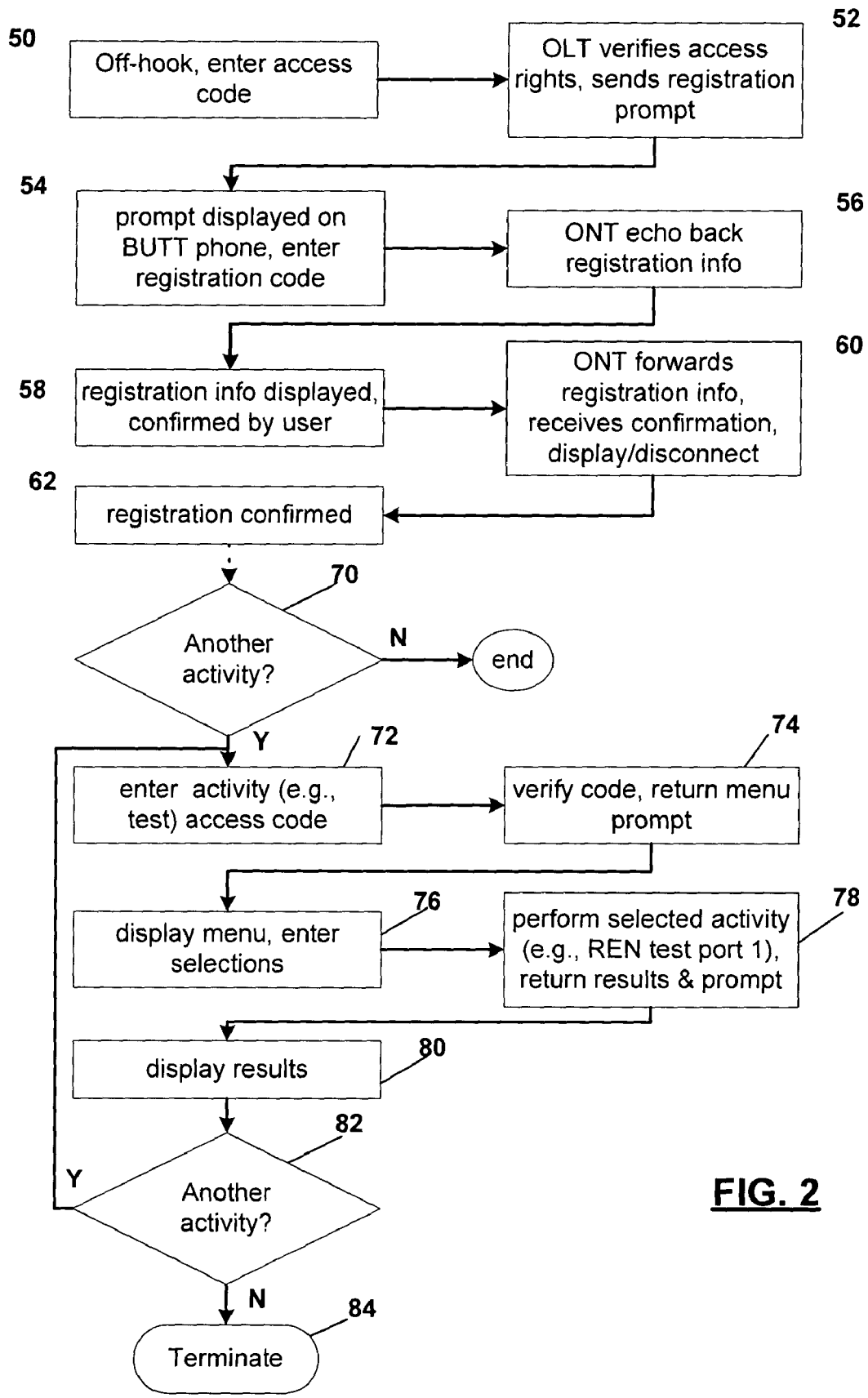
FIG. 2 is a flow chart illustrating installation and testing methods for use in the system of the first embodiment.

For security purposes, the BUTT set should be jacked into highest number RJ-11 port on the ONT. Once jacked in, a security access code is entered (see FIG. 2, step 50). The code can be designed such that it cannot be interpreted as an input phone number. An example would be "#*#*#*555" +a carrier defined number stored in a boot profile that is factory loaded.

Once entered correctly, the system would then reply with a message, such as: "Enter Registration Code—Followed by # sign" (step 52). If the BUTT set is still attached when registration completes, a message "Registration Complete, Menu Disabled" will be displayed.

The user would enter the registration code on the BUTT set keypad and appropriate termination like the # sign. This number could be echoed back via Caller ID for confirmation. This insures that the registration code is authenticated before the ONT tries to establish communications and reduces the chance of duplication or keystroke error. (Steps 54–58). The ONT then establishes communications with the carrier system and forwards the registration information for processing, and a signal sent back to the BUTT set either confirming successful registration or indicating that registration failed. (Steps 60, 62).

In support of maintenance and troubleshooting, a different menu system based on the same Call-ID menu system can be accessed. This can be a continuation of the same session as the initial registration, or a new session. If a new session, the technician may simply begin by plugging the BUTT set into the highest numbered POTS port on the ONT. Once plugged in, the technician enters a predefined test access code. Once accepted, the menu will be displayed on the Caller ID device. Through the menu system, the technician will be able to run ONT diagnostics and have the results displayed to the BUTT set Caller-ID screen. (Steps 70–80.)

From here, the system could display an "Installation Test" menu for initial turn-up testing. This menu may direct the technician to select MTL (matrix template library) tests, Ethernet test of internal systems test functions and provide PASS/FAIL information to the technician. This information can also be stored on the ONT for later retrieval by a carrier management system.

Example Test Series. The following provides an illustrative example of an installation test series that can be performed in connection with the first embodiment:

```
Test Menu Display: 1) POTS 2) ETHERNET 3) INTERNAL
User Entry: 1#
Menu Display: 1) REN 2) DC CURRENT 3) . . .
User Entry: 1#
Menu Display: Enter PORT 1–4
User Entry: 1#
Menu Display: TEST PASS 4 REN LOAD
Menu Display: 1) MAIN MENU 2) UP LEVEL 3) EXIT
```

Illustrative Features. In a currently preferred system, a Caller-ID interface is used to emulate a text terminal that supports ASCII characters 0–255. This system uses the DTMF tones of a telephone handset as inputs 0–9, # and *. This basic system conveniently utilizes a process similar to a UNIX TTY to handle the basic input and output for the two devices. This system has been preferably implemented with the following illustrative feature set:

Menu System Enable/Disable: This is settable in a profile, as a carrier may not wish to use the function. It typically works from only one RJ-11, and the port used for the interface is preferably always the highest number POTS port. In the V-142 this is port 4, in the V-182, this is port 8.

Interoperability: The system is preferably designed to work with BUTT sets like the Harris TS25D BUTT set, but can work with any test set that utilizes a GR-30-CORE Caller ID set and DTMF tone generation.

Wake-up Code: This is preferably defined in the factory-loaded system profile. This code is entered by the technician with the BUTT set via DTMF tones. The code should not be one that could be interpreted as a dialed number, so should start with a *,# (####) combination followed by a numeric sequence defined below as the Access Code. The length should be short, e.g., no more then 10 DTMF sequence symbols.

Access Code: The numeric portion of the overall access code entered by the technician through DTMF tones. The length should be short, e.g., no more then 10 DTMF sequence symbols.

Registration Code: The Registration code is stored as the PLOAM (physical layer operation, administration, and maintenance) Password and passed to the OLT upon request.

Illustrative States: The states described below preferably utilize the processes and requirements listed in GR-30-CORE for the transmission of data in the Off-Hook state. The menu system does not need to utilize the defined On-hook state. In the Off-hook state, the equipment sends a CAS (CPE (customer premises equipment) alerting signaling) signal to the Caller-ID set (CPE) before the transmission of any data and will wait for the 'ACK' (acknowledgement signal) to be returned by the Caller-ID set. The timing requirements between the CAS and ACK are currently defined in Section 2.2.3.1 of the GR-30-CORE specification.

All transmitted text messages preferably adhere to the message format defined in Section 2.3 of GR-30-CORE. For simplicity, all message can use GDMF (generic data message format) for transmission as defined in Section 2.3.3. The following are illustrative of the states used in a presently preferred embodiment:

State 0: On Hook

State 1: Port 4/8 off Hook. Read DTMF, if * or # check next looking for Wake-up code. If not * or #, pass thru for dialing. If second tone is a number pass thru for dialing. If second tone equals second tone in wake-up code, continue waiting and checking. If wake-up code valid, enter wake-up State 2. Otherwise, invalid phone number entered, process as phone number error.

State 2: Menu Wake-Up. Send Via FSK to Caller-ID set "Enter Access Code, select # to Enter". If no DTMF detected in five seconds, exit wake-up state and return to normal off-hook wait State 1. If DTMF detected, echo to Caller ID and validate after # detected against 'Access Code'. If no # detected in five seconds, return to State 1. If Access Code OK, go to State 3. If Access Code invalid, go to start of State 2 and increment failure counter. If Failed 3 times, go to State 1.

State 3: Enter Menu System-Get Registration ID. If Registration ID exists, go to State 4. Send to Caller ID: "Enter Registration ID, Select # to Enter". If no DTMF detected in five seconds, return to State 1. If DTMF detected, echo back to Caller ID until # detected (before eleventh tone). If no # by eleventh tone, send error message and return to State 3: "Error-Registration ID, max 10 digits". If a # is detected in eleven tones, ask for verification of Registration ID. Send Message to Caller ID "Reg ID is ? : Enter 1 to accept, 0 to re-enter, or 5 to exit". If 1 Received, send Message "Registration ID Accepted". If 0 received, go to start of State 3. If 5 received go to State 1. If no tone received in five seconds, go to State 1. If any other tone detected, error message: "Enter 1 to accept, 0 to re-enter, or 5 to exit".

State 4: Maintenance Menu. The Maintenance Menu should preferably be defined in an interpreted text file like a C-shell script. This will allow the carrier to add new commands over time as functionality changes. A small example follows for purposes of illustration:

```
SEND "Welcome to V-142"
SEND "Maintenance Menu: 1-Sys Diag 2-MLT 3-Exit
If 1 then SYSDIAG
If 2 then MLT
If 3 then EXIT
#SYSDIAG
SEND "1:Memory Test 2:?
#MLT
SEND "1:  2: REN  3:  4:  0: Up Level
If 1 then XXXX
If 2 then REN
If 3 then YYYY
If 4 then ZZZZ
If 0 then SYSDIAG
Else MLT
# REN
SEND "Select Line (1-4) 0: Up Level:"
If 1 then exec RENtest 1
If 2 then exec RENtest 2
If 3 then exec RENtest 3
If 4 then exec RENtest 4
If 0 then MLT
Else REN
If Return(0) SEND "Test Passed with REN Value XX"
Else SEND "Test Failed"
```

-continued

```
Go to REN
#EXIT
SEND "Exiting Menu System"
Return to State #1
```

The script may utilize command line codes to execute the required test with all parameters provided by through the script interface. In the example, REN test is a CLI (command line interface) command that requires a port number input. The returned data from the executed test will be sent to the Caller ID device. Bad Scripts should exit to State 1, with an error message "Error in Script at Line XX".

The system allows the technician to turn off the 'Write' functionality once turn-up testing is completed. The serial number or other required fields can only be changed via a remotely established terminal session. Non-intrusive test functions will still be available through this Craft method.

Many ONTs have RS-232 interfaces for connection of a data terminal. This port can provide access to a larger number of functions in the ONT operating system. The port is located in the carrier accessible area and can be disabled remotely through the EMS. With the flexibility of the system above, we see no reason for the technician to utilize this port.

Thus, in a first embodiment of my invention there is provided a system for configuring or testing optical network terminators (ONT) and premises communication systems, the embodiment including (a) an ONT, having programming including a menu-driven installation/test program capable of generating user prompts encoded for display via a caller ID display and responsive to user inputs; (b) a butt set coupled to the ONT, having a display operable to display alphanumeric information received from said program via caller ID formatted signaling, and including an input keypad for the user to input responses to the program prompts; (c) wherein the installation program generates menus for display on the BUTT phone, and is responsive to DTMF replies entered via the keypad in response to the information displayed on the display. Thus, the ONT programming controls system tests and services for the ONT in response to BUTT set inputs. ONT configuration information may additionally be provided to an operator of the BUTT set via the display.

While the above describes one embodiment of the invention used in connection with ONT installation and testing, those skilled in the art will appreciate that there are a number of alternatives, based on system design choices and the like, that still fall within the spirit of my invention. For example, different registration and other installation codes, authentication processes, and even additional menu-driven processes are possible, and are readily implemented via an appropriate change in ONT programming. Further, while the above has been described in connection with ONTs, its application can extend to other network terminating devices at a premises boundary, and the user prompt and input can be achieved by means similar, but not identical to, a caller-ID enabled (via LED, LCD or other display) BUTT set.

I claim:

1. A broadband network termination apparatus for coupling a premises network to a broadband network and provide broadband data services to the premises network, comprising:

a first data port adapted to receive a cable operably coupled to the broadband network, and a further voice services data port adapted to receive a cable operably coupled to the premises network;

a processor operably programmed for providing at least one of installation and test menus to a test set using inbound Caller ID-compatible signaling, and for receiving user response input from the test set using outbound DTMF signaling.

2. The apparatus of claim 1, further comprising a memory coupled to the processor and operably programmed, in response to a registration code from the test set, to cause the apparatus to be registered with a service provider by forwarding a registration message via the broadband network.

3. The apparatus of claim 1, further comprising a memory coupled to the processor and operably programmed, in response to an activity code input by the user, to provide the user with a series of prompts and indicators concerning a test of at least one of the apparatus and a networking service.

4. The apparatus of claim 1, wherein the apparatus is an optical network terminator operable for coupling the premises network to a passive optical network.

5. A broadband network termination system comprising:
   a network termination device, said device comprising a processor operably programmed for providing at least one of installation and test menus to, and receiving user response input from, a test set; and
   a test set comprising a display and a user input, the test set operable for receiving inbound Caller ID-compatible signaling carrying said at least one of installation and test menus and converting the received Caller ID-compatible signaling into a user-readable output via the display, and further operable for responding to said signaling by forwarding a user selection via the user input to the network termination device;
   whereby at least one of installation and tests of the network termination device are performed responsive to the user selections.

6. The system of claim 5, wherein the test set is a BUTT set and the network termination device is an optical network terminator operable for coupling the premises network to a passive optical network.

7. The system of claim 6, wherein the display of the BUTT set is a Caller ID display, and the user input comprises a numeric key pad and DTMF generator operable for converting user data input via the numeric key into outbound signaling.

8. The system of claim 6, wherein the optical network terminator further comprises a memory coupled to the processor and operably programmed, in response to an activity code input by the user, to provide the user with a series of prompts and indicators concerning a test of at least one of the apparatus and a networking service.

9. A method for setting up a network termination between a broadband network and a premises network comprising the steps of:
   a. operably coupling a network termination device and a test set device;
   b. providing an access code to the network termination device via the test set device, and sending a response from the network termination device to a user of the test set device via a display operable for displaying Caller ID-compatible data on the test set device.

10. The method of claim 9, wherein the network termination device is an optical network terminator (ONT) operable for coupling the premises network to a passive optical network and the test set is a BUTT set, wherein the step of providing an access code comprises sending a registration code entered via a key pad on the BUTT set to the ONT.

11. The method of claim 10, wherein the step of sending a response comprises sending a confirmation message to the BUTT set indicative of one of a successful registration or a failed registration.

12. The method of claim 11, wherein the registration code is sent to the ONT as a DTMF signal, step b. further comprising forwarding the registration code as a data message from the ONT to a further network processor operable for registering the ONT for services and responding with a confirmation code, wherein the step of sending a response to a user further comprises sending the confirmation code in a Caller-ID format for display via the BUTT set.

13. The method of claim 12, wherein the registration code is echoed back to the BUTT set by the ONT before the step of forwarding the data message to the further network processor.

14. The method of claim 9, wherein the network termination device is an optical network terminator (ONT) operable for coupling the premises network to a passive optical network and the test set is a BUTT set, wherein the step of providing an access code comprises sending a code indicative of a first test, entered via an input of the BUTT set, to the ONT.

15. The method of claim 14, wherein the step of sending a response further comprises sending a menu prompt for display via the BUTT set, the method further comprising:
   c. providing a selection message to the ONT in response to user input of a selection following display of the menu prompt via the BUTT set.

16. The method of claim 15, wherein step c. further comprises the ONT performing an activity in response to the selection message, and sending a message indicative of the activity to the BUTT set.

17. The method of claim 16, wherein the step of performing an activity comprises one of initiating a test and retrieving a test result, and the step of sending a message indicative of the activity comprises sending to the BUTT set a report message indicating one or more test results.

18. The method of claim 11, wherein the registration code is sent to the ONT as a DTMF signal, step b. further comprising forwarding the registration code as a data message from the ONT to a further network processor operable for registering the ONT for services and responding with a confirmation code, wherein the step of sending a response to a user further comprises sending the confirmation code in a Caller-ID format for display via the BUTT set.

* * * * *